United States Patent
Tanaka et al.

(10) Patent No.: US 8,157,251 B2
(45) Date of Patent: Apr. 17, 2012

(54) VIBRATION DAMPING MOUNTING ASSEMBLY

(75) Inventors: Eiji Tanaka, Komaki (JP); Tetsuya Miyahara, Wako (JP)

(73) Assignees: Tokai Rubber Industries, Ltd., Komaki-shi (JP); Honda Motor Co., Ltd., Tokyo (JP)

(*) Notice: Subject to any disclaimer, the term of this patent is extended or adjusted under 35 U.S.C. 154(b) by 1078 days.

(21) Appl. No.: 12/073,436

(22) Filed: Mar. 5, 2008

(65) Prior Publication Data

US 2008/0237953 A1 Oct. 2, 2008

(30) Foreign Application Priority Data

Mar. 29, 2007 (JP) ................................ 2007-088134

(51) Int. Cl.
*F16F 7/00* (2006.01)

(52) U.S. Cl. .............. 267/141; 267/140.12; 267/140.13; 267/140.14; 267/140.15; 267/292; 267/293; 267/294

(58) Field of Classification Search .......... 267/140.12–140.15, 141, 292–294
See application file for complete search history.

(56) References Cited

U.S. PATENT DOCUMENTS

| | | | | |
|---|---|---|---|---|
| 4,749,174 A * | 6/1988 | Kanda | ...................... | 267/140.12 |
| 5,671,908 A * | 9/1997 | Kato | ...................... | 267/140.12 |
| 6,032,937 A * | 3/2000 | Kojima et al. | ........... | 267/140.14 |
| 6,325,364 B1 | 12/2001 | Muramatsu | | |
| 6,419,213 B2 | 7/2002 | Murai | | |
| 6,481,700 B1 * | 11/2002 | Fujii | ........................ | 267/140.11 |
| 6,592,109 B2 * | 7/2003 | Yamaguchi et al. | ..... | 267/140.11 |
| 6,802,497 B2 * | 10/2004 | Hettler | ...................... | 267/140.12 |
| 2002/0180129 A1 * | 12/2002 | Frobisher et al. | ........ | 267/140.11 |

FOREIGN PATENT DOCUMENTS

| | | |
|---|---|---|
| JP | A-10-6142 | 1/1998 |
| JP | A-2003-28238 | 1/2003 |
| JP | A 2004-239376 | 8/2004 |
| JP | A 2005-106150 | 4/2005 |
| JP | A 2005-106151 | 4/2005 |

* cited by examiner

*Primary Examiner* — Bradley King
*Assistant Examiner* — Mahbubur Rashid
(74) *Attorney, Agent, or Firm* — Oliff & Berridge, PLC (57) ABSTRACT

A vibration damping mount assembly having a vibration damping mount main body and a tubular bracket. The tubular bracket is made of lightweight material composed of non-ferric metal or synthetic resin, and has an inside peripheral face including an upper tapered face and a lower tapered face that gradually expand in diameter towards openings at either axial end from an axially medial section. A flanged portion of a second mounting member is axially juxtaposed against an open end of the upper tapered face, while the lower tapered face is pressed against a rubber fitting, with the lower tapered face locked in contact against an annular mating face of the rubber fitting thereby providing dislodging of the vibration damping mount main body from the tubular bracket.

7 Claims, 5 Drawing Sheets

VIBRATION DAMPING MOUNTING ASSEMBLY

INCORPORATED BY REFERENCE

The disclosure of Japanese Patent Application No. 2007-088134 filed on Mar. 29, 2007, including the specification, drawings and abstract is incorporated herein by reference in its entirety.

BACKGROUND OF THE INVENTION

1. Field of the Invention

The present invention relates to a vibration damping mount assembly composed of a tubular bracket attached to a mounting main body which is employed as an engine mount in an automobile or the like.

2. Description of the Related Art

As one type of vibration damping couplings or vibration damping supports for installation interposed between components making up a vibration transmission system, there is known a vibration damping mount of a structure in which a first mounting member is positioned spaced apart from the opening at one axial end of a tubular second mounting member, with the first mounting member and the second mounting member being elastically connected by a main rubber elastic body. Such vibration damping mounts are suitable for use as engine mounts in automobiles, for example.

For reasons pertaining to the manufacturing process or the like, vibration damping mounts having the above described structure are sometimes designed so that the second mounting member is attached via a bracket to the vehicle body or other component to be connected in vibration-damping fashion. Specifically, where for example a certain extent of pre-compression is applied to the main rubber elastic body in order to enhance the durability of main rubber elastic body, one known method involves subjecting the second mounting member to a diameter-reduction process such as crimping from all directions. Where such a diameter-reduction process is carried out, if the attachment member to the component to be connected in vibration-damping fashion has been disposed directly on the second mounting member, it tends to be difficult to carry out diameter-reduction of the second mounting member in a satisfactory manner. To cope with this drawback, typically the second mounting member is press-fit into a separately formed tubular bracket and then the tubular bracket is fastened to the vehicle body or other component to be connected in vibration-damped fashion, whereby the second mounting member is attached to the component in a vibration damping fashion via the tubular bracket (as shown in U.S. Pat. No. 6,325,364, for example).

In order to prevent deformation or breakage of the tubular bracket due to the vibration damping mount main body being press-fit into the tubular bracket, conventional tubular brackets are typically formed of ferric metals which readily afford high levels of rigidity. However, in order to meet recent tendency to improve mileage and lighter weight of vehicles, extensive research has been made as to the use of aluminum alloys and other non-ferric metals or synthetic resin materials such as fiber-reinforced plastic as materials for forming the tubular bracket.

Where the tubular bracket has been fabricated of lightweight material such as non-ferric metal or synthetic resin, it is typically difficult to achieve satisfactory levels of load-bearing strength, as compared with a tubular bracket made of ferric metal. A resultant problem was that the tubular bracket tended to experience cracking during press-fitting of the second mounting member into a tubular bracket made of lightweight material. Another problem was that if the tubular bracket was made thick enough to ensure satisfactory load-bearing strength, the advantage of making the tubular bracket from lightweight material was defeated so that sufficient weight reduction of the tubular bracket was not achieved.

The present applicant has been proposed in JP-A-2005-106150 a vibration damping mount assembly adapted to avoid damage to a tubular bracket made of lightweight material such as non-ferric metal or synthetic resin during assembly of the vibration damping mount with the tubular bracket. Specifically, the vibration damping mount assembly taught in JP-A-2005-106150 has a structure in which the second mounting member of the vibration damping mount main body is fitted within a tubular bracket made of lightweight material with a gap present therebetween; and a rubber coupler in a compressed state is then interposed in the gap between the second mounting member and the tubular bracket, fixedly positioning the vibration damping mount main body and the tubular bracket. With this arrangement, the second mounting member is fit into the tubular bracket with a gap therebetween, so that it is possible to avoid damage to the tubular bracket due to pressing force during press-fitting of the second mounting member caused in the conventional structure.

However, further research conducted by the inventors has shown that, even with the structure taught in JP-A-2005-106150, there is clearly room for further improvement.

Specifically, with the vibration damping mount assembly disclosed in JP-A-2005-106150, the rubber coupler made of a rubber elastic body is interposed between the second mounting member and the tubular bracket, and the second mounting member is pushed and fitted into the tubular bracket in such a way that the rubber coupler is compressed between them. Accordingly there is a risk that after the second mounting member has been fitted within the tubular bracket, when the rubber coupler is subjected to shear deformation in the axial direction, its resilience will give rise to force acting on the vibration damping mount main body in a direction dislodging it from the tubular bracket (dislodging force), causing the vibration damping mount main body to undergo displacement relative to the tubular bracket. There is a consequent risk of the vibration damping mount main body experiencing shifting out of position relative to the tubular bracket; and in some instances the force of resistance of the vibration damping mount main body to becoming dislodged from the tubular bracket may not be sufficient to avoid the risk of the vibration damping mount main body falling out from the tubular bracket.

Moreover, the vibration damping mount assembly disclosed in JP-A-2005-106150 is designed so that frictional force produced between the tubular bracket and the rubber coupler may be utilized to create force of resistance to dislodging in order to prevent the vibration damping mount main body from becoming dislodged from the tubular bracket. Thus, in order to obtain a sufficient level of resistance to dislodging force, it will be necessary to ensure a sufficient level of compressive deformation of the rubber coupler, in other words, of perpendicular resistance acting on the rubber coupler. However, where the compressive deformation of the rubber coupler is sufficiently great, that fitting the vibration damping mount main body into the tubular bracket will become difficult. Even where the vibration damping mount main body and the tubular bracket are positioned together by fastening the vibration damping mount main body and the tubular bracket together with a bolt or the like as taught in JP-A-2005-106150, it was difficult in some instances to assemble the vibration damping mount main body so that it fits into the tubular bracket at the prescribed location.

SUMMARY OF THE INVENTION

It is an object of the present invention to provide a vibration damping mount assembly of novel structure whereby the vibration damping mount main body can be easily fit into the tubular bracket at a prescribed location, and so that stable assembly of the vibration damping mount main body and the tubular bracket can be maintained.

The above and/or optional objects of this invention may be attained according to at least one of the following modes of the invention. The following modes and/or elements employed in each mode of the invention may be adopted at any possible optional combinations.

A first mode of the present invention provides a vibration damping mount assembly comprising: a vibration damping mount main body wherein a first mounting member for attachment to one vibration damped-linkage component is positioned spaced apart from one axial opening of a tubular section of a second mounting member, with the first mounting member and the second mounting member elastically connected by a main rubber elastic body; and a tubular bracket of independent form being secured fitting externally onto the tubular section of the second mounting member of the vibration damping mount main body for attachment of the second mounting member to another vibration damped-linkage component via the tubular bracket. The vibration damping mount main body is furnished with a flanged portion at an peripheral edge of one axial opening of the tubular section of the second mounting member; a rubber fitting is formed covering an outside peripheral face of the tubular section of the second mounting member and an annular mating face which extends in a circumferential direction around the outside peripheral face of the tubular section is formed by the rubber fitting so as to project outwardly; the tubular bracket is made of lightweight material composed of non-ferric metal or synthetic resin, and has an inside peripheral face including an upper tapered face and a lower tapered face that gradually expand in diameter towards openings at either axial end from an axially medial section; and the flanged portion of the second mounting member of the vibration damping mount main body is axially juxtaposed against an open end of the upper tapered face of the tubular bracket while the lower tapered face of the tubular bracket is pressed against the rubber fitting formed on the second mounting member, with the lower tapered face locked in contact against the annular mating face of the rubber fitting thereby giving rise to resistance to dislodging of the vibration damping mount main body from the tubular bracket.

In the vibration damping mount assembly of structure according to the present invention, lighter weight can be achieved by making the tubular bracket from lightweight material such as non-ferric metal or synthetic resin. Moreover, resistance to dislodging of the vibration damping mount main body from the tubular bracket may be effectively achieved by pushing and mating the rubber fitting provided to the second mounting member against the lower tapered face constituting the inside peripheral of the tubular bracket. It is therefore possible, while achieving satisfactory dislodging resistance, to minimize stress acting on the lightweight material tubular bracket and advantageously prevent deformation or damage to the tubular bracket.

Because the inside peripheral face of the tubular bracket is composed of an upper tapered face and a lower tapered face which gradually expand in diameter towards the axial openings, when the vibration damping mount main body is fitted into the tubular bracket the vibration damping mount main body will be guided to the prescribed location in the axis-perpendicular direction by the guiding action of the upper tapered face and can be fit in easily. Thus, the vibration damping mount main body can be manufactured easily.

A second mode of the invention provides a vibration damping mount assembly according to the first mode, wherein the lower tapered face of the tubular bracket, at the boundary portion thereof with the upper tapered face, is locked in contact against the annular mating face of the rubber fitting provided to the second mounting member of the vibration damping mount main body.

By so doing, locked contact of the lower tapered face of the tubular bracket with the rubber fitting provided to the second mounting member will occur at the boundary portion of the upper and lower tapered faces, whereby mating of the lower tapered face with the annular mating face of the rubber fitting will effectively ensure dislodging resistance, while at the same time enabling the vibration damping mount main body to be fit into the tubular bracket with a relatively low level of insertion force. Thus, deformation or damage to the tubular bracket during assembly of the vibration damping mount main body with tubular bracket can be more effectively prevented.

A third mode of the invention provides a vibration damping mount assembly according to the first or second mode, wherein a ridge line located at a boundary of the upper tapered face and the lower tapered face and extending in the circumferential direction on the inside peripheral face of the tubular bracket is formed with inside diameter dimension greater than an outside diameter dimension of the tubular section of the second mounting member.

By so doing, the inside diameter dimension of the ridge line where the inside diameter dimension of the upper tapered face and the lower tapered face is smallest will be greater than the outside diameter dimension of the tubular section of the second mounting member, so that when the vibration damping mount main body is fitted into the tubular bracket it will be possible to avoid damage or deformation of the tubular bracket caused by contact between the outside peripheral face of the tubular section of the second mounting member and the inside peripheral face of the tubular section of the tubular bracket.

A fourth mode of the invention provides a vibration damping mount assembly according to any one of the first through third modes, wherein a plurality of recesses extending in the axial direction is formed on an outside peripheral face of the rubber fitting.

By employing such a structure, it is possible to minimize the area of contact between the outside peripheral face of the rubber fitting and the inside peripheral face of the tubular bracket, thus reducing the insertion force required when fitting the vibration damping mount main body into the tubular bracket. Moreover, by forming multiple recesses that extend in the axial direction, insertion of the vibration damping mount main body into the tubular bracket through guiding action in the axial direction can be achieved more advantageously.

A fifth mode of the invention provides a vibration damping mount assembly according to any one of the first through fourth modes, wherein an annular step face is formed in the axially medial section of the main rubber elastic body, the rubber fitting in a section thereof situated to the other side of the annular step face in the axial direction with respect to a first side thereof projecting peripherally outward whereby the annular mating face is constituted by the annular step face;

and the section of the rubber fitting situated to the other side of the annular step face in the axial direction and projecting peripherally outward being caused to undergo compressive deformation through disposition in contact against the lower tapered face of the tubular bracket.

With the above structure, it is possible to prevent the contact area between the rubber fitting and the tubular bracket from being any larger than necessary when the vibration damping mount main body is fitted into the tubular bracket, while at the same time ensuring a large anchoring area for the rubber fitting with respect to the second mounting member. It is possible thereby to advantageously avoid problems such as separation of the rubber fitting from the second mounting member, while at the same time preventing increased insertion force, so as to avoid damage etc. to the tubular bracket.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
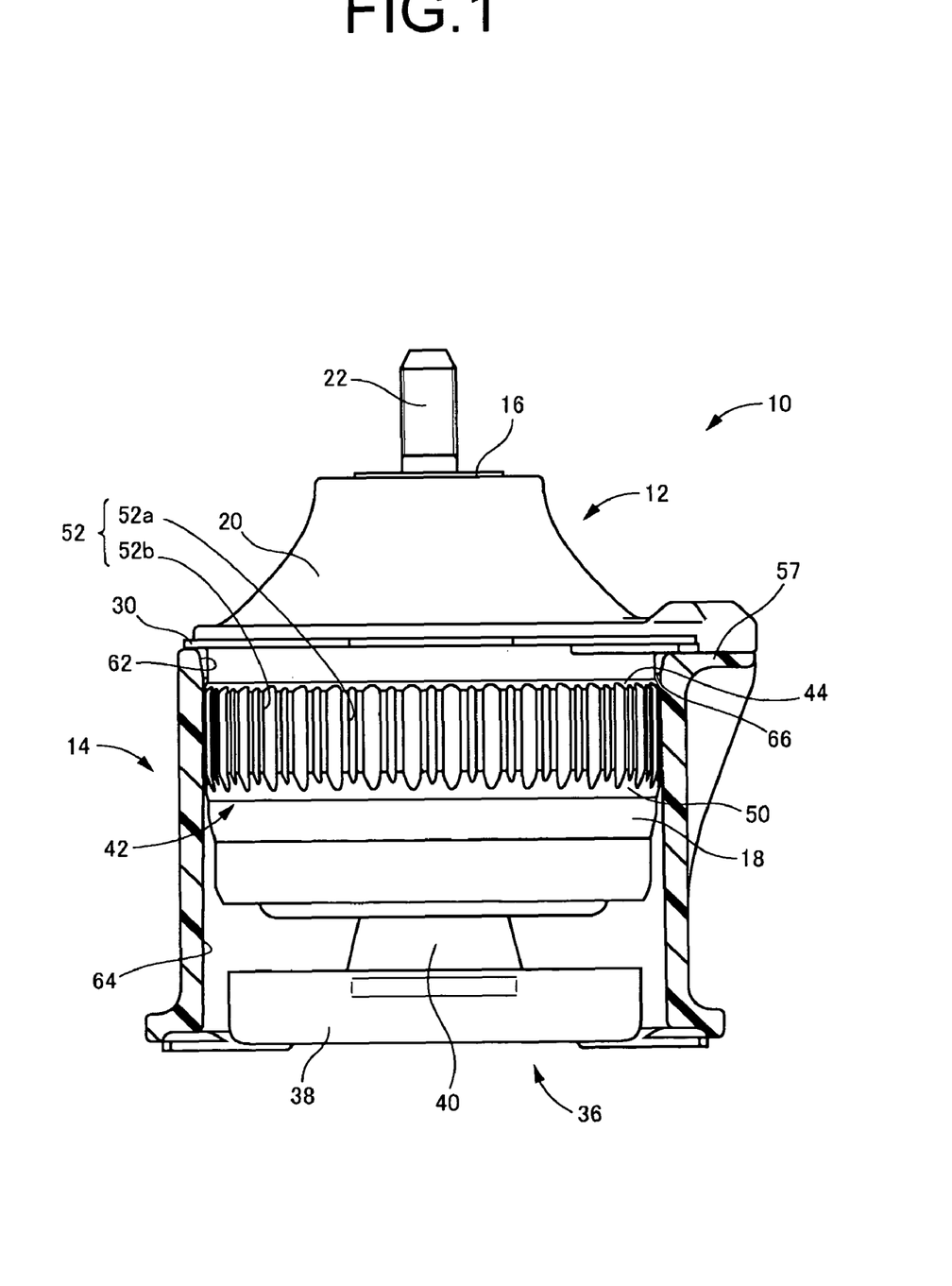
FIG. 1 is a vertical cross sectional view of a vibration damping mount assembly of construction according to a first embodiment of the present invention, taken along line 1-1 of FIG. 3.
Figure 2:
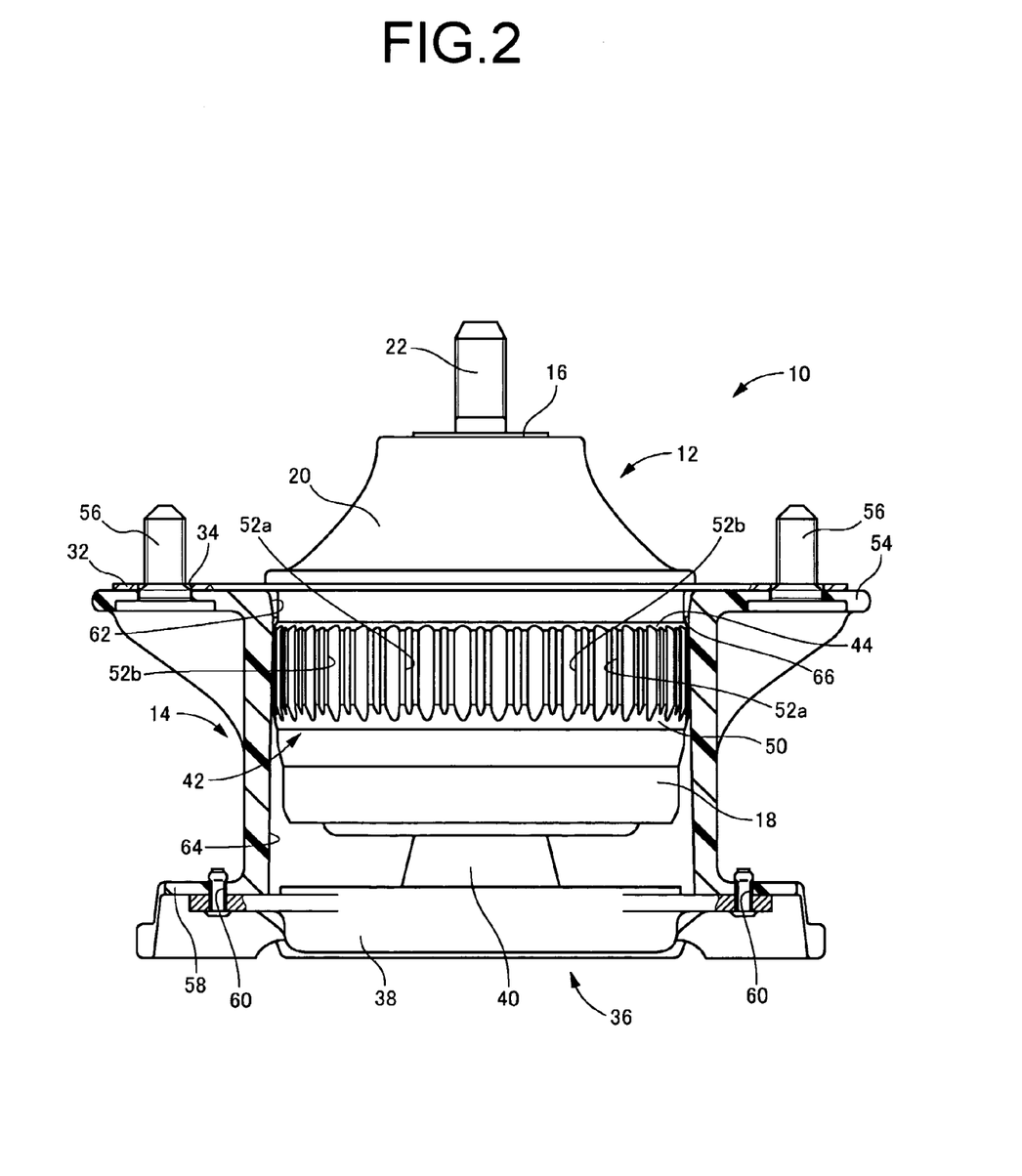
FIG. 2 is a vertical cross sectional view of the vibration damping mount assembly of FIG. 1, taken along line 2-2 of FIG. 3.
Figure 3:
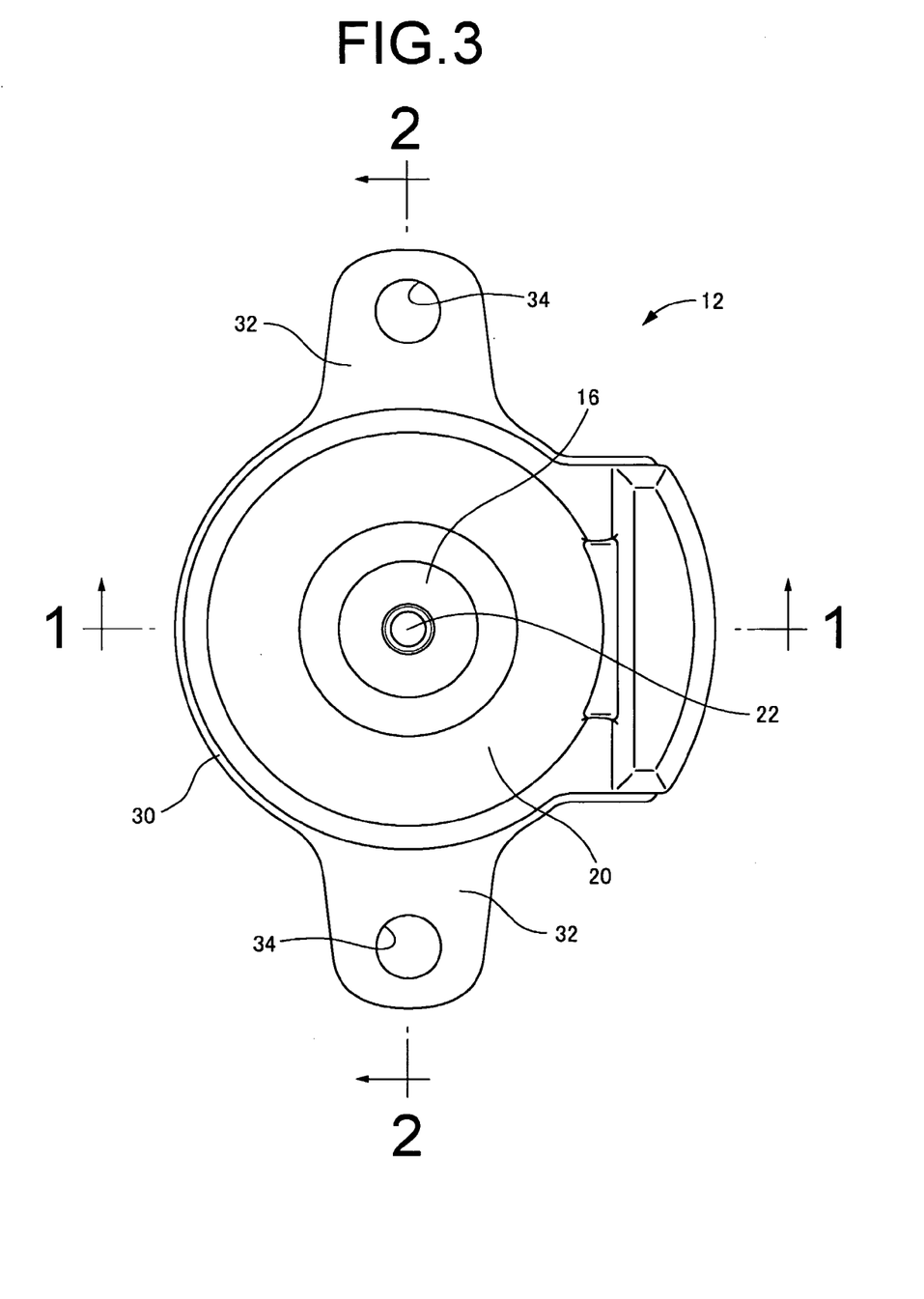
FIG. 3 is a top plane view of the vibration damping mount assembly of FIG. 1.

FIGS. 1 and 2 show a vibration damping mount assembly 10 as a first embodiment of the present invention. The vibration damping mount assembly 10 includes an engine mount 12 as the vibration damping mount main body; and a tubular bracket 14. To describe in more detail, as shown in FIGS. 1 through 3, the engine mount 12 includes a first mounting member 16 of metal and a second mounting member 18 of metal, and a main rubber elastic body 20 by which the first and second mounting members 16, 18 are elastically connected together. The first mounting member 16 is attached to a power unit, not shown, while the second mounting member 18 is attached via the tubular bracket 14 to a vehicle body, not shown, thus providing the power unit with vibration damped support on the vehicle body. In the description herein, the vertical direction represents the direction of principal vibration input. It is also the vertical direction in FIG. 1, which is the axial direction of the tubular bracket 14.

The first mounting member 16 has a generally circular block shape and is made of high-rigidity material such as aluminum alloy. The first mounting member 16 has an integrally formed attachment bolt 22 which projects axially upward. The first mounting member 16 is fastened to the power unit side by threading the attachment bolt 22 into a component on the power unit side, not shown.

Figure 4:
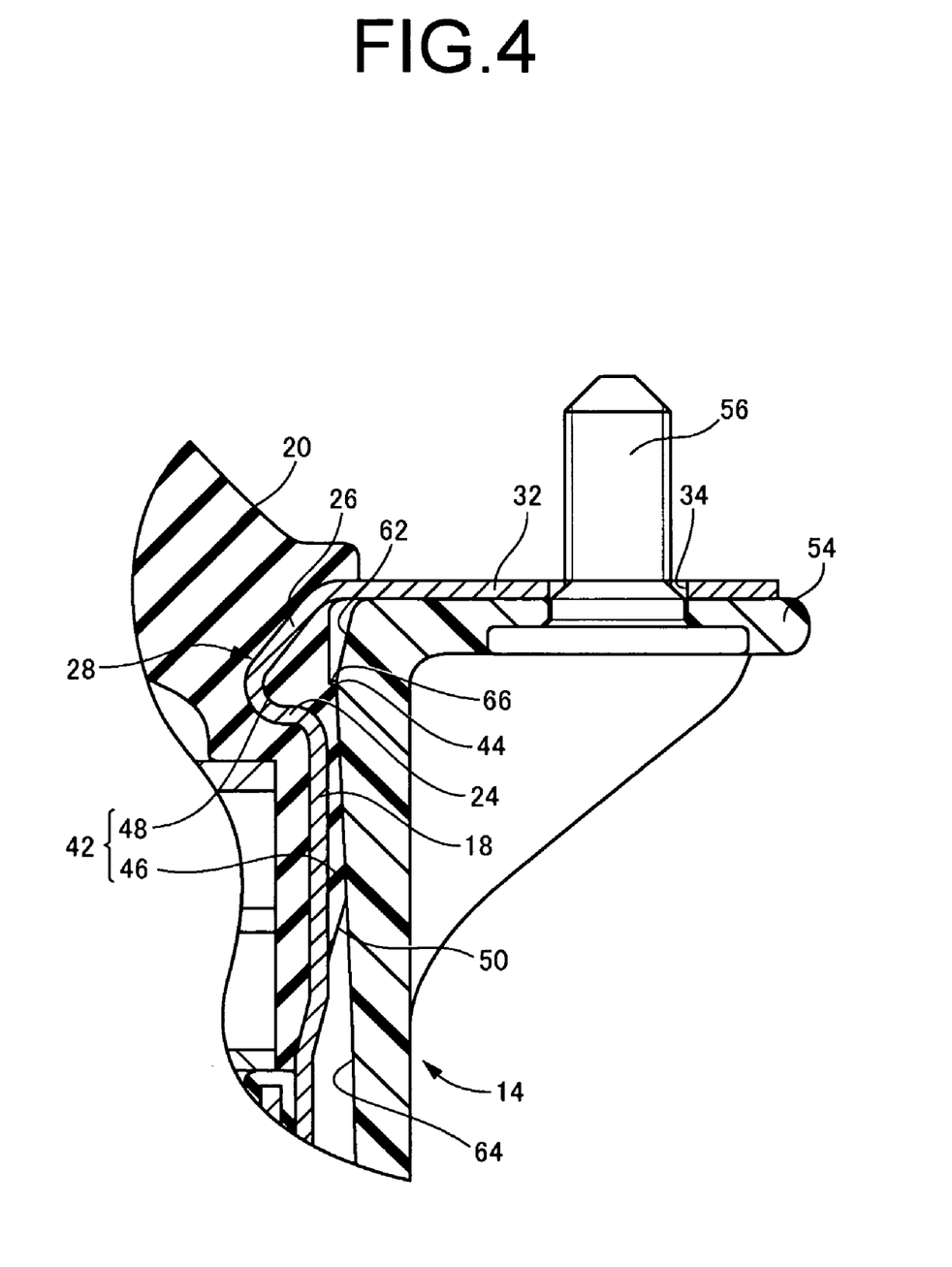
FIG. 4 is an enlarged fragmentary view of a principal part of the vibration damping mount assembly of FIG. 1.

The second mounting member 18 has a tubular section of large-diameter, generally round tubular shape, and is made of high-rigidity material such as aluminum alloy. As shown in FIG. 4, a step portion 24 which extends diametrically inward is formed at the axial upper end of the tubular section of the second mounting member 18. The section of the second mounting member 18 to the upper side of the step portion 24 in the axial direction constitutes a tapered portion 26 of gradually expanding diameter towards the upper end. The axial upper end section of the second mounting member 18 is thereby curved so as to recess peripherally inward, forming a constricted portion 28 of generally unchanging cross section that extends all the way around in the circumferential direction.

A flanged portion 30 is integrally formed at the rim of the opening at the upper axial end of the second mounting member 18. The flanged portion 30 is disposed so as to extend diametrically outward in the axis-perpendicular direction and is integrally formed with the tapered portion 26 at the upper end of the second mounting member 18. A pair of fastening pieces 32, 32 which extend outwardly in the diametrical direction by an appreciable distance are disposed on the flanged portion 30 in sections thereof situated in opposition across an axis lying in the diametrical direction. Bolt passage holes 34 are formed in these fastening pieces 32, 32 so as to pass through each in the thickness direction (axial direction).

The first mounting member 16 and the second mounting member 18 are arranged with the first mounting member 16 positioned coaxially with the second mounting member 18 and spaced apart axially thereabove, with the first mounting member 16 and the second mounting member 18 connected by the intervening main rubber elastic body 20.

While the engine mount 12 in the present embodiment is a fluid-filled type of vibration damping device that exhibits effective vibration damping action based on flow behavior of a non-compressible fluid sealed in the interior, the specific internal structure of the engine mount 12 is a known structure, having been disclosed, for example, in JP-A-2005-106150 and moreover does not represent the essential part of the present invention; as such, it will not be discussed herein.

A pneumatic actuator 36 is installed axially below the engine mount 12. This pneumatic actuator 36 includes an outer wall member 38 and a rubber elastic wall 40. The engine mount 12 in the present embodiment is a fluid-filled type of vibration damping device of negative pressure-switched type whose vibration damping ability is variable through the action of the pneumatic actuator 36. The specific internal structure of the pneumatic actuator 36 is also a known structure disclosed, for example in JP-A-2005-106150 and moreover does not represent the essential part of the present invention and will not be discussed herein.

One portion of the outside peripheral face of the tubular portion of the second mounting member 18 is covered by a squeeze rubber elastic body 42 as the rubber fitting. The squeeze rubber elastic body 42 is of generally round tubular shape overall. As shown in FIG. 4, it is anchored to the outside peripheral face of the second mounting member 18, over an area extending from the axially medial section to the axial upper end section of the tubular section of the second mounting member 18. In the present embodiment, the squeeze rubber elastic body 42 is integrally formed with the main rubber elastic body 20.

The squeeze rubber elastic body 42 in the present embodiment has in its axially medial section an annular step face 44 as the annular mating face. Specifically, in the present embodiment, the axially lower section of the squeeze rubber elastic body 42 constitutes a squeeze portion 46 which projects peripherally outward relative to an anchoring portion 48 in the upper section, with the annular step face 44 being formed extending all the way around the circumference at the boundary between the squeeze portion 46 and the anchoring portion 48. In the present embodiment, the annular step face 44 is a sloped face which slopes gradually downward in the axial direction going peripherally outward.

The lower end face of the squeeze rubber elastic body 42 constitutes a tapered guide face 50. The tapered guide face 50 has a taper which inclines gradually outward going axially upward. In the present embodiment, the slope angle of the tapered guide face 50 is smaller than the slope angle of the annular step face 44 with respect to the axial direction, and the tapered guide face 50 extends over a wider area in the axial direction than does the annular step face 44.

In the present embodiment, guide grooves 52 constituting a multitude of recesses opening onto the outside peripheral face and extending the axial direction are formed in the squeeze portion 46 of the squeeze rubber elastic body 42, giving the outside peripheral surface of the squeeze portion 46 a bumpy contour in the circumferential direction. In the present embodiment, the guide grooves 52 are composed of relatively narrow guide grooves 52*a* and relatively wide guide grooves 52*b* positioned in an alternating arrangement in the circumferential direction. In the present embodiment, contact faces of narrower extension in the circumferential direction than the guide grooves 52 are formed between adjacently situated guide grooves 52*a* and guide grooves 52*b* in the circumferential direction.

In the present embodiment, the squeeze rubber elastic body 42 is formed with length in the axial direction sufficient to reach the flanged portion 30 which has been integrally formed at the upper end of the second mounting member 18, and the upper end face of the squeeze rubber elastic body 42 is vulcanization bonded to the lower face of the flanged portion 30. Furthermore, the area at the outside peripheral face of the constricted portion 28 which has been disposed at the upper end section of the second mounting member 18 is filled by a rubber elastic body integrally formed with the squeeze rubber elastic body 42. In the present embodiment, the squeeze rubber elastic body 42 is thicker in the section where the constricted portion 28 is formed. Moreover, the upper end portion of the squeeze portion 46 of the squeeze rubber elastic body 42 is situated to the outside peripheral side of the constricted portion 28 of the second mounting member 18, with the annular step face 44 being formed in the axially medial section of the squeeze rubber elastic body 42, which is thicker owing to the shape of the constricted portion 28. In other words, the annular step face 44 of the squeeze rubber elastic body 42 is situated axially above the step portion 24 of the second mounting member 18.

Figure 5:
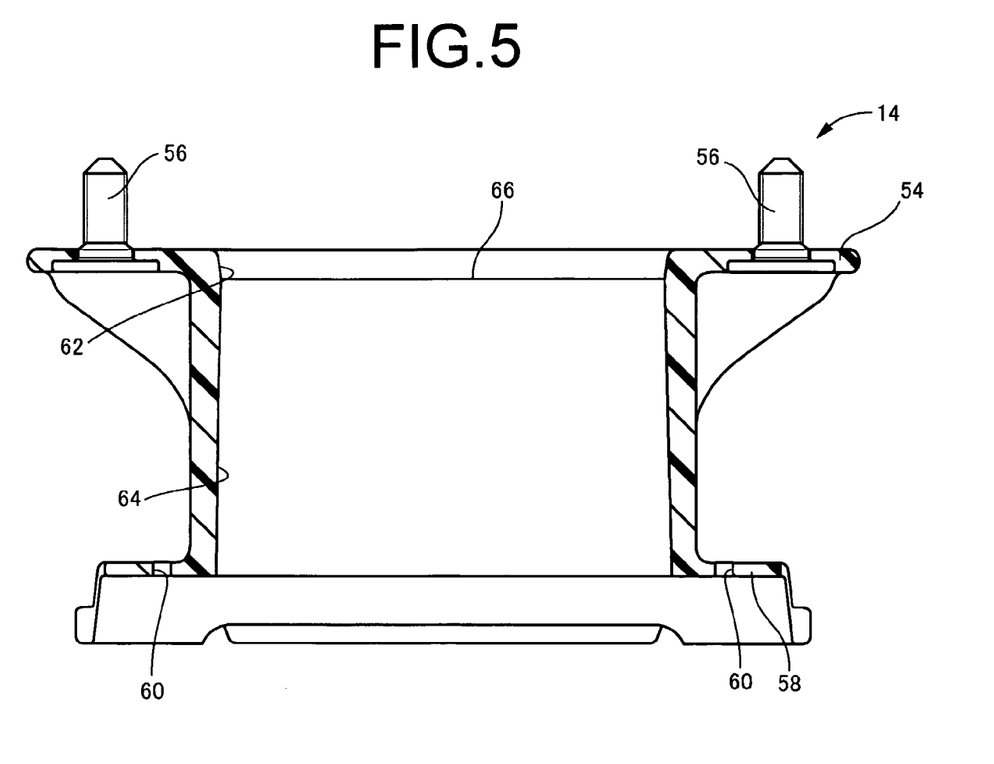
FIG. 5 is a vertical cross sectional view of a tubular bracket of the vibration damping mount assembly of FIG. 1.

The engine mount 12 is fitted into the tubular bracket 14. As shown in FIG. 5, the tubular bracket 14 is made of lightweight material such as aluminum alloy or other non-ferric metal or fiber-reinforced hard synthetic resin, and has a generally circular tube shape overall. A pair of fastener support pieces 54, 54 which project to either side along an axis lying in the diametrical direction are integrally formed at the upper end of the tubular section of the tubular bracket 14. A fastening bolt 56 is disposed on each of the fastener support pieces 54, 54, passing through the fastener support piece 54 in the thickness direction and extending axially upward. In the present embodiment, a stopper support portion 57 which extends to one side in the diametrical direction is integrally formed at the upper end of the tubular bracket 14, so as to extend a prescribed length in the circumferential direction, in a diametrical direction orthogonal to the direction of projection of the pair of fastener support pieces 54, 54.

An attachment leg portion 58 which extends towards the outside peripheral side is integrally formed at the axial lower end of the tubular bracket 14. Rivet passage holes 60 are formed in this attachment leg portion 58 so as to pass through the attachment leg portion 58 in the axial direction. Bolt holes, not shown, are also formed in the attachment leg portion 58. The tubular bracket 14 is securely attached to the vehicle body side by passing bolts through the bolt holes.

Here, as shown in FIGS. 4 and 5, the inside peripheral face of the tubular bracket 14 in the embodiment is composed of an upper tapered face 62 and a lower tapered face 64. The upper tapered face 62 is disposed so as to constitute an area which extends from the opening at the axial upper end to an axially medial part of the inside peripheral face of the tubular bracket 14, and has a tubular tapered face which slopes so as to gradually flare out upward in the axial direction. The lower tapered face 64 is disposed so as to constitute an area which extends from an axially medial part to the opening at the axial lower end of the inside peripheral face of the tubular bracket 14, and has a tubular tapered face which slopes so as to gradually flare out downward in the axial direction.

The upper tapered face 62 and the lower tapered face 64 interconnect in an axially medial part of the tubular bracket 14. Thus, in the axially medial part of the tubular bracket 14 which constitutes the boundary between upper tapered face 62 and the lower tapered face 64 there is formed an apical mating portion 66 having the form of an inwardly convex ridgeline. In the present embodiment, this apical mating portion 66 is formed continuously about the entire circumference and projects peripherally inward with a beak-shaped contour. In the present embodiment, the inside diameter dimension of the tubular bracket 14 is smallest at the location where the apical mating portion 66 is formed; and the inside diameter of the tubular bracket 14 at the location where the apical mating portion 66 is formed is greater than the maximum outside diameter dimension of the second mounting member 18. Furthermore, as shown in FIG. 5, in the present embodiment the apical mating portion 66 is biased closer towards the axial upper opening side of the tubular bracket 14.

The upper and lower tapered faces 62, 64 can be advantageously formed utilizing the mold-release tapered faces which are provided for easy withdrawal of the forming mold after the tubular bracket 14 has been molded, during the process of molding the tubular bracket 14.

Specifically, in the present embodiment, the tubular bracket 14 is a molded article produced by injection molding or the like of hard synthetic resin material. After the synthetic resin material is packed into the cavity formed by the mold and a molded article of the tubular bracket 14 having the desired shape has been formed, the mold is withdrawn from the tubular bracket 14. In the present embodiment, the mold for molding the tubular bracket 14 includes upper and lower mold sections for establishing the shape of the inside peripheral face of the tubular bracket 14. The extraction direction of the upper mold section is axially upward while the extraction direction of the lower mold section is axially downward. The upper and lower mold sections are designed to fit together at a prescribed location in the axially medial section of the tubular bracket 14. Thus, the mold-release taper of the upper mold section and the mold-release taper of the lower mold section are respectively formed on the inside peripheral face of the tubular bracket 14, with the upper and lower tapered faces 62, 64 being formed by the mold-release tapers of the upper and lower mold sections.

The tubular bracket 14 is then secured fitting externally onto the engine mount 12. Specifically, the tubular section of the second mounting member 18 is inserted into the tubular section of the tubular bracket 14 though the opening thereof on the axial upper side, juxtaposing the flanged portion 30 which has been integrally formed with the second mounting member 18 against the upper edge-face of the tubular bracket 14, as well as juxtaposing the fastening pieces 32 which have been integrally formed with the second mounting member 18 against the fastener support pieces 54 which have been integrally formed with the tubular bracket 14, thereby positioning the engine mount 12 and the tubular bracket 14 relative to one another in the axial direction. In the present embodiment, the flanged portion 30 of the second mounting member 18 is formed extending out from the upper end of the constricted portion 28. Thus, the inside diameter dimension of the flanged portion 30 will be sufficiently small and it will overlap the upper edge face of the tubular bracket 14 over a large area.

Furthermore, rebound stopper members, not shown, are juxtaposed onto the fastening pieces 32 from above, with the fastening bolts 56 which are anchored to the fastener support pieces 54 and extend axially upward therefrom being passed through the axially juxtaposed fastener support pieces 54, the fastening pieces 32, and the rebound stopper members. Fastening nuts, not shown, are then threaded onto the fastening bolts 56 to fasten together the fastening pieces 32 and the fastener support pieces 54, thereby fastening together the engine mount 12 and the tubular bracket 14. The second mounting member 18 constituting part of the engine mount 12 is thereby attached to the vehicle body, not shown, via the tubular bracket 14. Also, the engine mount 12 may be easily positioned in the circumferential direction with respect of the tubular bracket 14 by passing the fastening bolts 56 disposed on the fastener support pieces 54 through the bolt passage holes 34 which have been formed in the fastening pieces 32.

Here, the minimum inside diameter dimension of the tubular section of the tubular bracket 14 is greater than the maximum outside diameter dimension of the second mounting member 18. Thus, with the engine mount 12 and the tubular bracket 14 in the assembled state, a gap will be present between the tubular section of the second mounting member 18 and the tubular section of the tubular bracket 14, and the tubular section of the second mounting member 18 and the tubular section of the tubular bracket 14 will be spaced apart from each other all the way around the circumference.

The squeeze rubber elastic body 42 which has been anchored to the outside peripheral face of the second mounting member 18 will then be interposed between the tubular section of the second mounting member 18 and the tubular section of the tubular bracket 14. Specifically, the squeeze portion 46 of the squeeze rubber elastic body 42 which has been anchored to the outside peripheral face of the second mounting member 18 is larger in outside diameter dimension than the inside diameter dimension of the tubular bracket 14 in proximity to the apical mating portion 66. Thus, as shown in enlarged view in FIG. 4, with the engine mount 12 installed in the tubular bracket 14, the squeeze portion 46 which constitutes the lower edge section of the squeeze rubber elastic body 42 will be pressed against the lower tapered face 64 which has been formed on the inside peripheral face of the tubular bracket 14.

In short, the engine mount 12 is inserted from the second mounting member 18 end thereof in the axial direction into the tubular bracket 14 from the upper opening of the upper tapered face 62. The squeeze rubber elastic body 42 which has been formed covering the outside peripheral face of the second mounting member 18 is then arranged with the squeeze portion 46 which constitutes the large-diameter section thereof situated to one side of the annular step face 44 (the section on the axial lower end in the drawing) positioned past the apical mating portion 66 of the tubular bracket 14 and towards the lower tapered face 64 end thereof. Here, the outside diameter dimension of the squeeze portion 46 of the squeeze rubber elastic body 42 is greater than the inside diameter dimension of the tubular bracket 14 in proximity to the apical mating portion 66, and therefore the squeeze rubber elastic body 42 undergoes deformation so as to be pinched and compacted between the second mounting member 18 and the lower tapered face 64 of the tubular bracket 14, and is interposed between the second mounting member 18 and the tubular bracket 14.

By interposing the squeeze rubber elastic body 42 in a compressed state between the second mounting member 18 and the tubular bracket 14 in this way, frictional force will be produced at the site of contact between the squeeze rubber elastic body 42 and the tubular bracket 14, so as to prevent relative displacement of the engine mount 12 and the tubular bracket 14 in the axial direction. Contact detaining force acting as resistance to dislodgement in the axial direction will also be achieved through this frictional force. In the present embodiment, the lower tapered face 64 is urged into contact against the axial upper end section of the squeeze portion 46 on the one hand, while being spaced apart from the axial lower end section on the other. In FIG. 4, the slope angle of the upper and lower tapered faces 62, 64 is depicted in exaggerated form. In the present embodiment, detaining force of the tubular bracket 14 with respect to the apical mating portion 66 is also produced at the annular step face 44 of the squeeze rubber elastic body 42.

With the engine mount 12 and the tubular bracket 14 of the present embodiment in the assembled state, the squeeze rubber elastic body 42 will become pushed against the frusto-conical side face contour of the lower tapered face 64 which gradually constricts in diameter toward the axial upper end. Therefore, the engine mount 12 subjected to outside force such that it undergoes relative displacement upward in the axial direction with respect to the tubular bracket 14, the lower tapered face 64 will be pushed with greater force against and detained in contact by the annular step face 44 of the squeeze rubber elastic body 42. It is therefore possible to advantageously achieve resistance to dislodging force tending to produce relative displacement of the engine mount 12 axially upward with respect to the tubular bracket 14. Consequently, it will be possible to prevent relative displacement of the engine mount 12 with respect to the tubular bracket 14 due to resilience of the squeeze rubber elastic body 42 when subjected to shear deformation during insertion of the second mounting member 18 into the tubular bracket 14, so that the engine mount 12 can be securely assembled with the tubular bracket 14 at the prescribed location in the axial direction.

Moreover, with the engine mount 12 and the tubular bracket 14 in the assembled state, the apical mating portion 66 formed at the boundary between the upper tapered face 62 and the lower tapered face 64 will be positioned axially above the annular step face 44 which is disposed in the axially medial section of the squeeze rubber elastic body 42. It is possible thereby, through mating of the apical mating portion 66 with the annular step face 44, to achieve effective resistance to dislodgement of the engine mount 12 from the tubular bracket 14, so as to advantageously position it in the axial direction.

Furthermore, in the present embodiment, the inside peripheral face of the tubular bracket 14 is constituted as a tapered face which extends sloped with respect to the axial direction, while the outside peripheral face of the squeeze rubber elastic body 42 is a tubular face which extends parallel with the axial direction. Therefore, when inserting the engine mount 12 into the tubular bracket 14, the area of contact between the inside peripheral face of the tubular bracket 14 and the outside peripheral face of the squeeze rubber elastic body 42 can be made fairly small, allowing the engine mount 12 to be inserted into the tubular bracket 14 with a relatively low level of pushing force. Moreover, in the present embodiment, the inside diameter dimension of the tubular bracket 14 is smallest at the location where the apical mating portion 66 is formed, and the apical mating portion 66 has a beak-shaped contour which gradually constricts in width in the axial direction moving peripherally inward towards its projecting distal end. Consequently, the outside force needed when inserting the engine mount 12 into the tubular bracket 14 can be more advantageously kept to a minimum. Accordingly, breakage or deformation of the tubular bracket 14 due to assembly of the engine mount 12 can be advantageously prevented, even where a lightweight material such as non-ferric metal or synthetic resin has been used as the material for the tubular bracket 14.

Furthermore, in the present embodiment, a large number of the guide grooves 52 which extend in straight lines the axial direction have been formed on the outside peripheral face of the squeeze portion 46 in the squeeze rubber elastic body 42. Thus, the area of contact between the inside peripheral face of the tubular bracket 14 and the outside peripheral face of the squeeze rubber elastic body 42 can be made fairly small, minimizing resistance when the engine mount 12 is inserted into the tubular bracket 14. Consequently, assembly of the engine mount 12 with the tubular bracket 14 can be accomplished with a relatively low level of insertion force, and damage such as cracking or deformation of the tubular bracket 14 can be prevented. In the present embodiment in particular, since the guide grooves 52 are constituted by a large number of recesses which extend in straight lines the axial direction, the engine mount 12 can be inserted smoothly without catching, through the guiding action of the guide grooves 52.

Furthermore, in the present embodiment, the tapered guide face 50 disposed at the axial lower edge of the squeeze rubber elastic body 42 has a slope angle with respect to the axial direction which is smaller than the slope angle with respect to the axial direction of the annular step face 44 disposed in the axially medial section of the squeeze rubber elastic body 42. Consequently, the engine mount 12 can be pushed into the tubular bracket 14 relatively easily due to the guiding action of the tapered guide face 50 during insertion of the engine mount 12 into the tubular bracket 14 on the one hand. Moreover, if the components once assembled are subjected to dislodging force, effective resistance to dislodging can be achieved through mated contact between the annular step face 44 and the squeeze portion 46 with the lower tapered face 64 and the apical mating portion 66.

While the invention has been show hereinabove in terms of a preferred embodiment, this is merely exemplary, and the invention is in no wise limited to the specific disclosure in the embodiment herein.

Figure 6:
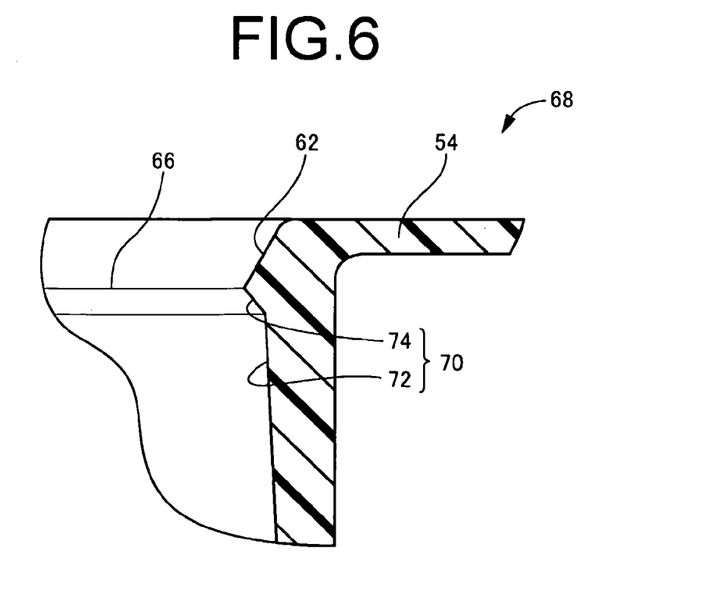
FIG. 6 is an enlarged fragmentary view of a principal part of a tubular bracket employed in a vibration damping mount assembly of construction according to a second embodiment of the present invention.

For example, in the preceding embodiment, the upper tapered face 62 and the lower tapered face 64 were each constituted as a tapered face sloping at a constant slope. However, the upper tapered face 62 and the lower tapered face 64 may instead be constituted, for example, as bowing faces whose slope changes gradually, or as a combination of multiple flat sloping faces with different slopes. In a specific example, as with a tubular bracket 68 illustrated in FIG. 6, the lower tapered face 70 may have a first tapered face 72 of relatively small slope relative to the axial direction formed in a region extending from the opening at the axial lower end to the axially medial section of the tubular bracket 68, and a second tapered face 74 of relatively large slope relative to the axial direction formed in a region extending from the axially medial section of the tubular bracket 68 to the apical mating portion 66. In other words, the upper tapered face 70 may have a larger slope relative to the axial direction in its axial upper end section in proximity to the apical mating portion 66 than it does in its axial lower end section. With this design, the second tapered face 74 of the tubular bracket 68 can be advantageously disposed in mated contact with the annular step face 44 of the squeeze rubber elastic body 42, and resistance to dislodging of the engine mount 12 from the tubular bracket 68 can be more effectively achieved.

In the preceding embodiment, the annular mating face was constituted by the annular step face 44 which is disposed in the axially medial section of the squeeze rubber elastic body 42 which was provided as the rubber fitting. However, it is not always necessary to form the annular mating face in the axially medial section of the rubber fitting. Specifically, the axial upper end face of the rubber fitting could be utilized to constitute an annular mating face, for example.

In the preceding embodiment, the guide grooves 52 provided as the recesses on the outside peripheral face of the squeeze rubber elastic body 42 extended in a straight-line pattern in the axial direction. However, the recesses need not necessarily extend in a straight-line pattern in the axial direction. Multiple recesses could instead be formed extending in the circumferential direction and spaced apart from each other by prescribed distance in the axial direction, for example. With this design, resistance to dislodging of the vibration damping mount main body from the tubular bracket can be more advantageously achieved. Also, in the preceding embodiment, guide grooves 52a and guide grooves 52b of different groove width dimension were formed as the recesses. However, the recesses could instead by constituted by multiple groove-shaped portions having identical groove width dimension.

The specific structure of the vibration damping mount main body should not be construed as limited to that of the engine mount 12 shown in the embodiment hereinabove, and various other vibration damping devices of structures known in the art may be implemented analogously as the vibration damping mount main body without departing from the spirit of the present invention. Specifically, by way of example of a vibration damping mount main body, the preceding embodiment described an engine mount 12 of fluid-filled type provided with a pressure-receiving chamber a portion of whose wall is constituted by the main rubber elastic body 20 and which gives rise to pressure fluctuations when vibration is input, and with an equilibrium chamber a portion of whose wall is constituted by a flexible film and which readily permits change in volume, the two chambers being filled with a non-compressible fluid and intercommunicating through an orifice passage, and adapted to exhibit vibration damping action based on resonance and other flow behavior of fluid induced to flow between the two chambers; however, the vibration damping mount main body could also be a vibration damping device of non-fluid filled type.

Moreover, in the preceding embodiment, the annular step face 44 provided as the annular mating face was situated to the outside peripheral side of the constricted portion 28, with the squeeze rubber elastic body 42 being relatively thick at the location where the annular step face 44 is formed; however, the annular step face 44 could also be disposed so as to be located to the outside peripheral side of the second mounting member 18 in the section thereof to axial lower side of the step portion 24, for example. With this design, the squeeze rubber elastic body 42 can be made relatively thin in the diametrical direction at the location where the annular step face 44 is formed; and fastening of the engine mount 12 with the tubular bracket 14 through mated contact of the annular step face 44 with the lower tapered face 64 can be advantageously achieved.

It is also to be understood that the present invention may be embodied with various other changes, modifications and improvements, which may occur to those skilled in the art, without departing from the spirit and scope of the invention defined in the following claims.

What is claimed is:

1. A vibration damping mount assembly comprising:
   a vibration damping mount main body wherein a first mounting member for attachment to one of two vibration damped-linkage components is positioned spaced apart from one axial opening of a tubular section of a second mounting member, with the first mounting member and the second mounting member elastically connected by a main rubber elastic body; and
   a tubular bracket of independent form being secured fitting externally onto the tubular section of the second mounting member of the vibration damping mount main body for attachment of the second mounting member to an other of the two vibration damped-linkage components via the tubular bracket,
   wherein the vibration damping mount main body is furnished with a flanged portion at a peripheral edge of one axial opening of the tubular section of the second mounting member;
   a rubber fitting is formed covering an outside peripheral face of the tubular section of the second mounting member and an annular mating face which extends in a circumferential direction around the outside peripheral face of the tubular section is formed by the rubber fitting so as to project outwardly;
   the tubular bracket is made of lightweight material composed of non-ferric metal or synthetic resin, and has an inside peripheral face including an upper tapered face which slopes so as to gradually flare out upward in an axial direction and a lower tapered face which slopes so as to gradually flare out downward in the axial direction so that the upper tapered face and the lower tapered face interconnect in an axially medial part of the inside peripheral face of the tubular bracket;
   the flanged portion of the second mounting member of the vibration damping mount main body is axially juxtaposed against an open end of the upper tapered face of the tubular bracket, while the lower tapered face of the tubular bracket is pressed against the rubber fitting formed on the second mounting member, with the lower tapered face locked in contact against the annular mating face of the rubber fitting thereby giving rise to resistance to dislodging of the vibration damping mount main body from the tubular bracket.

2. The vibration damping mount assembly according to claim 1, wherein the lower tapered face of the tubular bracket, at a boundary portion thereof with the upper tapered face, is locked in contact against the annular mating face of the rubber fitting provided to the second mounting member of the vibration damping mount main body.

3. The vibration damping mount assembly according to claim 1, wherein a ridge line located at a boundary of the upper tapered face and the lower tapered face and extending in a circumferential direction on the inside peripheral face of the tubular bracket is formed with an inside diameter dimension greater than an outside diameter dimension of the tubular section of the second mounting member.

4. The vibration damping mount assembly according to claim 1, wherein a plurality of recesses extending axially is formed on an outside peripheral face of the rubber fitting.

5. The vibration damping mount assembly according to claim 4, wherein the plurality of recesses comprises a plurality of guide grooves extending axially composed of relatively narrow guide grooves and relatively wide guide grooves positioned in an alternating arrangement in the circumferential direction.

6. The vibration damping mount assembly according to claim 1, wherein an annular step face is formed in an axially medial section of the rubber fitting by projecting peripherally outwardly one section of the rubber fitting situated on one side of the annular step face in the axial direction with respect to another section situated on another side so that the annular mating face is constituted by the annular step face, and the section of the rubber fitting situated on the one side of the annular step face in the axial direction and projecting peripherally outward undergoes compressive deformation through disposition in contact against the lower tapered face of the tubular bracket.

7. The vibration damping mount assembly according to claim 1, wherein the lower tapered face has a first tapered face of relatively small slope relative to the axial direction formed in a region extending from a lower axial end thereof to the axially medial section of the tubular bracket, and a second tapered face of relatively large slope relative to the axial direction formed in a region extending from the axially medial section of the tubular bracket to a boundary portion between the upper tapered face and the lower tapered face.

* * * * *